US012778344B2

(12) United States Patent
Long

(10) Patent No.: US 12,778,344 B2
(45) Date of Patent: Nov. 3, 2026

(54) ELECTROMAGNETIC SWITCH, TIME-ADJUSTABLE CONTROLLER AND TOASTER

(71) Applicants: Sanqiaohui (Foshan) New Materials Co., Ltd., Foshan (CN); Foshan Gaopeng New Material Partnership (Limited Partnership), Foshan (CN)

(72) Inventor: Kewen Long, Foshan (CN)

(73) Assignees: Sanqiaohui (Foshan) New Materials Co., Ltd., Foshan (CN); Foshan Gaopeng New Material Partnership (Limited Partnership), Foshan (CN)

( * ) Notice: Subject to any disclaimer, the term of this patent is extended or adjusted under 35 U.S.C. 154(b) by 613 days.

(21) Appl. No.: 18/372,053

(22) Filed: Sep. 22, 2023

(65) Prior Publication Data

US 2025/0049262 A1 Feb. 13, 2025

(51) Int. Cl.

| | |
|---|---|
| ***A47J 37/08*** | (2006.01) |
| ***H01H 50/18*** | (2006.01) |
| ***H01H 50/44*** | (2006.01) |
| ***H01H 50/54*** | (2006.01) |
| ***H05B 1/02*** | (2006.01) |

(52) U.S. Cl.

CPC .......... *A47J 37/0842* (2013.01); *H01H 50/18* (2013.01); *H01H 50/44* (2013.01); *H01H 50/54* (2013.01); *H05B 1/0225* (2013.01); *H05B 1/0261* (2013.01)

(58) Field of Classification Search

CPC ............................ A47J 37/0842; H01H 50/18
USPC ................................................ 335/188, 200
See application file for complete search history.

(56) References Cited

U.S. PATENT DOCUMENTS

| | | | | |
|---|---|---|---|---|
| 1,962,033 A * | 6/1934 | Reichold | H01H 51/12 | 335/181 |
| 2,806,103 A * | 9/1957 | Gelzheiser | H01H 73/50 | 335/43 |
| 6,481,341 B1 * | 11/2002 | Choi | A47J 37/0842 | 99/332 |
| 7,600,468 B2 * | 10/2009 | Zhang | H01H 3/503 | 99/332 |

* cited by examiner

*Primary Examiner* — Alexander Talpalatski

(57) ABSTRACT

An electromagnetic switch includes a base, a first static contact piece, a second static contact piece, a movable contact piece, a movable member and an intermediate driving member; the movable contact piece is electrically connected to the first static contact piece; the movable contact piece comprises an on-off portion capable of moving up and down; the movable member is rotatably connected to the base; the movable member comprises a first action portion; the intermediate driving member allows the on-off portion to move down to contact the second static contact piece or move up to be away from the second static contact piece; the electromagnetic driving assembly includes a coil and a magnetic core; the magnetic core is capable of moving up to push the first action portion up when the coil is electrified.

13 Claims, 14 Drawing Sheets

ELECTROMAGNETIC SWITCH, TIME-ADJUSTABLE CONTROLLER AND TOASTER

TECHNICAL FIELD

This invention generally relates to the technical field of control switches, and more particularly, to an electromagnetic switch, a time-adjustable controller, and a toaster.

BACKGROUND

The operating principle of the electromagnetic switch of a conventional toaster is that, after a button switch is pressed, a turn-on assembly is moved to enable two electrical connection pieces to be connected. At this point, the operation circuit of the toaster is turned on, and meanwhile, an electromagnet is electrified to attract the turn-on assembly, so that the toaster keeps operating. When the operation needs to be ended, the electromagnet is no longer electrified such that the attraction to the turn-on assembly disappears. At this point, the turn-on assembly is reset, and the two electrical connection pieces are disconnected.

Under such circumstances, to maintain the attraction during operation, the electromagnet in the electromagnetic switch must always be electrified such that the power consumption continues. When the electromagnet is electrified, the coil continuously generates heat. Thus, the resistance is increased, the current is reduced, and the generated magnetic force is weakened, making the attraction to the turn-on assembly insufficient such that the toaster stops operating when the preset duration is not reached. Moreover, due to the generated heat and prolonged operation, the paint layer on the surface of the coil is easily aged, and after the anti-rust oil on the surface of the silicon steel sheet becomes dried due to the heat, the surface of the silicon steel sheet may rust easily such that the functional life is greatly shortened. In addition, because the electromagnet is electrified for a prolonged period, when it is no longer electrified, there is residual magnetism and the electromagnet still possesses magnetic force, resulting in the failure of the reset of the turn-on assembly. Thus, the electromagnetic switch is continuously turned on and the toaster keeps operating, causing hidden dangers of the toaster.

SUMMARY

The purpose of the present invention is to provide an electromagnetic switch, a time-adjustable controller and a toaster. Through adopting the present invention, the technical problems in the prior art including the high heat of the coil, low attraction of the coil, rust on the surface of the silicon steel sheet, shortened functional life and the influence of residual magnetism on on-off actions caused by the coil electrified all the time for keeping the attraction when the electromagnetic switch operates are effectively solved.

To achieve the above purpose, the present invention adopts the following technical solution: an electromagnetic switch comprises a base, a first static contact piece, a second static contact piece, a movable contact piece, a movable member, an intermediate driving member and an electromagnetic driving assembly, wherein the first static contact piece is fixed on the base, wherein the first static contact piece and the second static contact piece are fixed on the base, and the second static contact piece is spaced apart from the first static contact piece, wherein the movable contact piece is arranged between the first static contact piece and the second static contact piece, wherein the movable contact piece is electrically connected to the first static contact piece, wherein the movable contact piece comprises an on-off portion capable of moving up and down, wherein the on-off portion is arranged on an upper side of the second static contact piece, wherein the movable member is rotatably connected to the base, wherein the movable member is arranged on an upper side of the movable contact piece, wherein the movable member comprises a first action portion, wherein the first action portion is arranged on one side of a rotating shaft connecting the movable member and the base that is close to the first static contact piece, wherein the intermediate driving member is arranged between the movable member and the movable contact piece, wherein an upper side of the intermediate driving member is connected to the movable member, and a lower side of the intermediate driving member is connected to the movable contact piece, wherein the intermediate driving member is configured to be capable of propelling the on-off portion to move up and down along with the rotation of the movable member, so that the on-off portion is capable of moving down to contact the second static contact piece or moving up to be away from the second static contact piece, wherein the electromagnetic driving assembly comprises a coil and a magnetic core capable of moving up and down, wherein the coil is fixed on the base, and the magnetic core is arranged on a lower side of the first action portion, wherein when the coil is electrified, the magnetic core moves up to push the first action portion up, wherein the first static contact piece and the second static contact piece are switched between an on state and an off state by means of the movable member, the intermediate driving member, the movable contact piece and the electromagnetic driving assembly, wherein in an on state, the coil is not electrified and the magnetic core is at the lower position, wherein at this point, the first action portion is at the lower position, which enables the intermediate driving member to propel the on-off portion to move down to contact the second static contact piece, so that the first static contact piece and the second static contact piece are connected, wherein in an off state, the coil is electrified to generate a magnetic force to attract the magnetic core to move up, wherein at this point, the upper side of the magnetic core pushes the first action portion up while enabling the movable member to rotate, which allows the intermediate driving member to propel the on-off portion to move up to be away from the second static contact piece, so that the first static contact piece and the second static contact piece are disconnected:

The first static contact piece and the second static contact piece are connected to an external circuit: when the first static contact piece and the second static contact piece are disconnected, the external circuit does not operate, and when the first static contact piece and the second static contact piece are connected, the external circuit operates:

When the electromagnetic switch is turned on, namely, when the first static contact piece and the second static contact piece are connected, the coil is in a non-electrified state, and the movable contact piece keeps the first static contact piece and the second static contact piece connected under the action of the movable member and the intermediate driving member, so that the external circuit is kept on; when the electromagnetic switch needs to be turned off, the coil is electrified for a short period of time to make the magnetic core move, and the movable contact piece is separated from the second static contact piece under the action of the movable member and the intermediate driving member, which enables the first static contact piece and the second static contact piece to be disconnected such that the external circuit is switched off:

The coil in the electromagnetic switch of the present invention does not need to be electrified all the time when the circuit is on, and the coil only needs to be electrified for a small period of time when the circuit is switched off; the heat generated by the coil is very little such that it may be ignored; the surface of the silicon steel piece is not easy to rust, the normal on and off actions are ensured, and a prolonged functional life is achieved; in addition, in the present invention, the off state of the electromagnetic switch depends on the magnetic force generated by the coil, so that the prior problem relating to the failure of achieving a smooth disconnection caused by the residual magnetism of the electromagnet is effectively avoided.

In another preferred embodiment of the present invention, the intermediate driving member is a first spring, an upper side of the movable contact piece is provided with a shifting portion for shifting the direction of the movable contact piece, and a lower side of the movable member is provided with a spring fixing portion: an upper side of the first spring is connected to the spring fixing portion, a lower side of the first spring is connected to the shifting portion, and the first spring is configured to change the force direction of the shifting portion along with the rotation of the movable member such that the direction of the shifting portion is shifted:

In an on state, the movable member forms a pressure towards the second static contact piece on the first spring, thereby enabling the first spring to propel the shifting portion and the on-off portion to move down to contact the second static contact piece:

After being switched to an off state, the movable member forms a pressure towards the first static contact piece on the first spring, thereby enabling the first spring to propel the shifting portion and the on-off portion to move up to be away from the second static contact piece:

The first spring is connected between the movable member and the movable contact piece, and when the movable piece rotates, the force direction of the first spring is changed, thereby propelling the movable contact piece to move: by utilizing the elasticity and deformation ability of the first spring, the upper and lower sides of the first spring are connected to the movable member and the movable contact piece while imposing an acting force, and the first spring is capable of deforming along the variation of the position and posture of the movable member and the movable contact piece:

In another preferred embodiment of the present invention, the movable contact piece is rotatably connected to the first static contact piece, thereby allowing the on-off portion to move up and down. The movable contact piece is electrically connected to the first static contact piece at a position where the movable contact piece is rotatably connected to the first static contact piece. The movable contact piece is electrified while rotating with the first static contact piece, so that the structure is significantly simplified.

In another preferred embodiment of the present invention, one side of the first static contact piece close to the second static contact piece is provided with a first clamping groove with an upward opening, and the movable contact piece is provided with a clamping portion; the clamping portion is arranged in the first clamping groove and is capable of swinging up and down: second clamping grooves are formed in two sides of the clamping portion, and the second clamping grooves are clamped with the two sides of the first clamping groove such that the movement of the movable contact piece is limited: the on-off portion is arranged on one side of the clamping portion close to the second static contact piece, and the movable contact piece and the first static contact piece are rotatably connected and electrically connected through the clamping connection between the clamping portion and the first clamping groove:

Through the clamping connection of the clamping portion, the second clamping groove and the first clamping groove, the first static contact piece supports the movable contact piece, and when the first spring changes the force direction of the shifting portion, the movable contact piece rotates up and down: meanwhile, the movable contact piece is limited between the first static contact piece and the second static contact piece: the first spring presses the movable contact piece down in the first clamping groove to keep the movable contact piece in contact with the first static contact piece, so that the movable contact piece is electrified: thus, a simple structure is realized.

In another preferred embodiment of the present invention, a transition piece is arranged on an upper side of one end of the movable contact piece close to the first static contact piece: the transition piece extends towards one side of the second static contact piece, and the shifting portion is arranged on one side of the transition piece close to the second static contact piece:

Under the acting force of the first spring, the shifting portion acts on an end portion of one side of the movable contact piece close to the first static contact piece, thereby enabling the movable contact piece to easily move according to the acting force of the first spring.

In another preferred embodiment of the present invention, the spring fixing portion is located on a lower side of the rotating shaft connected to the movable member and the base. This arrangement allows the direction of the acting force of the first spring to be easily changed when the movable member rotates.

In another preferred embodiment of the present invention, the movable portion further comprises a second action portion, wherein the first action portion and the second action portion are respectively arranged on two sides of the rotating shaft connected to the movable member and the base: the base is further provided with a bell, and one side of the second action portion away from the first action portion is provided with a striking head: the striking head is arranged at a position corresponding to the bell, and when the second action portion rotates down, the striking head is capable of striking the bell:

When the operation is completed, at this point, the coil passes through the magnetic core to push the first action portion up, the second action portion rotates down, and the striking head strikes the bell to produce a prompt sound, thereby notifying a user that the operation is completed.

In another preferred embodiment of the present invention, the electromagnetic switch further comprises an upper cover arranged on an upper side of the base, and the first static contact piece, the second static contact piece, the movable contact piece, the movable member and the electromagnetic driving assembly are all arranged between the base and the upper cover. The upper cover is provided with an opening, and the opening is formed on an upper side of the movable member. The first static contact piece, the second static contact piece and the electromagnetic driving assembly are arranged in the base and the upper cover, so that effects of shielding and protection are achieved.

The present invention also provides a time-adjustable controller having the aforesaid electromagnetic switch: the time-adjustable controller comprises a timer; The timer is provided with a control voltage output terminal, and the control voltage output terminal is electrically connected to the coil: the timer is configured to control the control voltage output terminal to output a voltage to the coil when a preset duration is reached;

Through adopting the aforesaid electromagnetic switch, when the time-adjustable controller operates, the timer is initiated, and when the preset duration is reached, the control voltage output terminal is controlled to output a voltage to the coil such that the coil is electrified: at this point, the magnetic core acts to turn off the electromagnetic switch: when the time-adjustable controller operates, the coil is not electrified such that the heat generated is low.

The present invention also provides a toaster having the aforesaid time-adjustable controller: the toaster further comprises a housing and a handle capable of moving up and down: the time-adjustable controller is arranged in the housing, and the lower side of the handle is capable of pressing the first action portion of the movable member down:

Through adopting the aforesaid time-adjustable controller, after the handle is pressed down, the toaster starts to operate such that the baking and timing functions are initiated; when the preset duration is reached, the coil is switched off and the toaster stops operating; during the operation of the toaster, the coil is not electrified, so that the heat generated by the coil becomes less.

In another preferred embodiment of the present invention, the toaster further comprises a second spring connected to the handle, and the movable member further comprises a second action portion: the first action portion and the second action portion are respectively arranged on two sides of the rotating shaft connected to the movable member and the base: an upper side of the second action portion is provided with a first hook, and a lower side of the handle is provided with a pressing portion and a second hook: the pressing portion is arranged on an upper side of the first action portion, and the pressing portion is configured to press the first action portion down: the second hook is configured to be hooked with the first hook when the first action portion is pressed down, and the second spring is capable of imposing an upward pulling force on the pressed handle;

When the handle is pressed by a user, the second spring is stretched, the pressing portion of the handle presses the first action portion down, and the second action portion rotates up: at this point, the first hook and the second hook are hooked with each other, and the toaster starts to operate; after the handle is released, the second spring pulls the handle up; because the first hook and the second hook are hooked with each other, the handle pulls the second action portion up, and the movable member limits the upward movement of the handle: therefore, the movable member and the electromagnetic switch are kept in an operating state, and the toaster keeps operating: after the toaster is stopped, the first action portion is pushed up, the second action portion rotates down, the first hook and the second hook are separated, and the handle moves up under the tension force of the second spring.

In another preferred embodiment of the present invention, the timer is provided with a time-adjustment potentiometer and an indicator light: the housing is provided with a time-adjustment knob connected to the time-adjustment potentiometer: the time-adjustment knob is provided with a light-transmitting hole for allowing the light rays emitted by the indicator light to pass through:

Through adjusting the time-adjustment potentiometer by the time-adjustment knob, the operation duration may be preset: the indicator light is capable of emitting light, and the light is emitted to the exterior of the toaster through the light-transmitting hole to indicate the on-off state and/or the adjustment position.

In another preferred embodiment of the present invention, the toaster further comprises a light-guide rotating shaft assembly, and the light-guide rotating shaft assembly is arranged between the time-adjustment knob and the indicator light; one end of the light-guide rotating shaft assembly close to the time-adjustment knob is fixedly connected to the time-adjustment knob, and one end of the light-guide rotating shaft assembly close to the indicator light is directly opposite to the indicator light: the light-guide rotating shaft assembly is made of a light-guide material, thereby allowing the light emitted by the indicator light to pass through the light-transmitting hole via the light-guide rotating shaft assembly and is emitted to the exterior of the time-adjustment knob: the time-adjustment potentiometer is arranged on one side of the indicator light close to the time-adjustment knob, an adjustment hole is formed in the time-adjustment potentiometer, and the indicator light is directly opposite to the adjustment hole: one side of the light-guide rotating shaft assembly close to the indicator light is inserted into the adjustment hole, and the light-transmitting hole and the rotation center of the time-adjustment knob are arranged in a staggered manner:

When the time-adjustment knob is connected to the time-adjustment potentiometer through the light-guide rotating shaft assembly, the adjustment hole of the time-adjustment potentiometer may be rotated to adjust the time-adjustment potentiometer; the light is guided to the light-transmitting hole of the time-adjustment knob through the light-guide rotating shaft assembly, and the indicator light is arranged inside the time-adjustment potentiometer; by making the light-guide rotating shaft assembly connected to the time-adjustment knob a medium for guiding light, it is unnecessary to arrange an additional light-guide structure, achieving a simple structure, reducing the cost of the time-adjustment knob, and lowering the space occupation: meanwhile, the time-adjustment potentiometer does not impede the guiding of light, the light-transmitting hole is still capable of receiving the light emitted by the indicator light and the brightness is basically kept uniform: moreover, it is unnecessary to consider whether the rotated light-transmitting hole is directly opposite to the indicator light.

BRIEF DESCRIPTION OF THE DRAWINGS

To clearly describe the embodiments of the present invention or the technical solutions in the prior art, the drawings required in the description of the embodiments or prior art are briefly introduced. Obviously, the drawings in the description are merely some embodiments of the present invention. For those skilled in the art, other drawings may be obtained based on the structures shown in these drawings without paying creative labor.

FIG. 6 is a schematic diagram illustrating a three-dimensional structure of the time-adjustable controller of the present invention when the base is removed and the controller is turned on;

Figure 1:
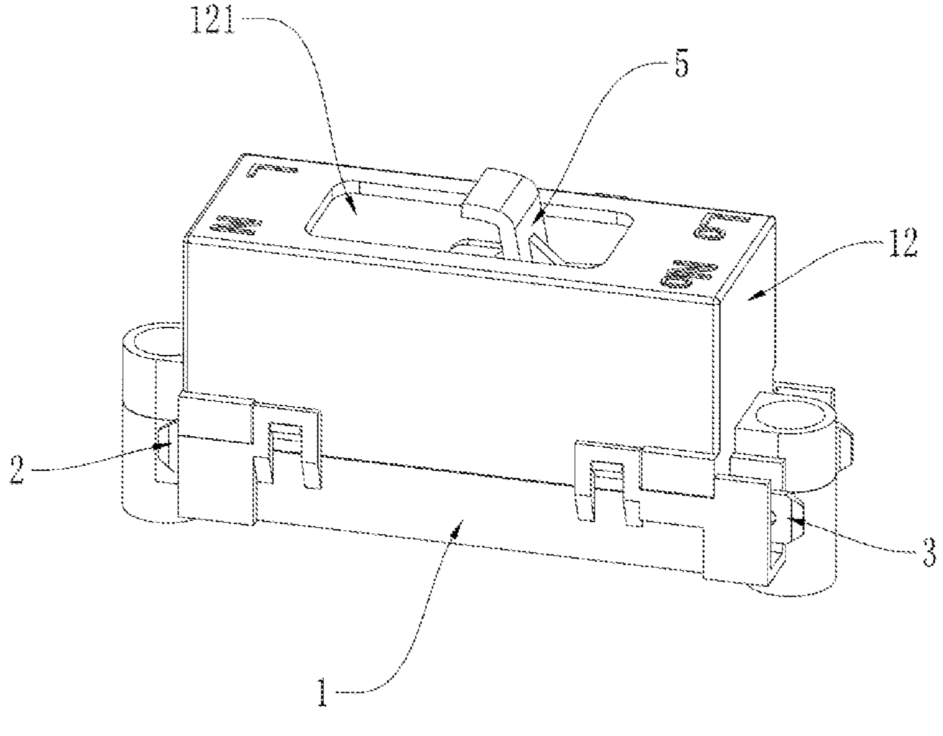
FIG. 1 is a schematic diagram illustrating a three-dimensional structure of the electromagnetic switch of the present invention.
Figure 2:
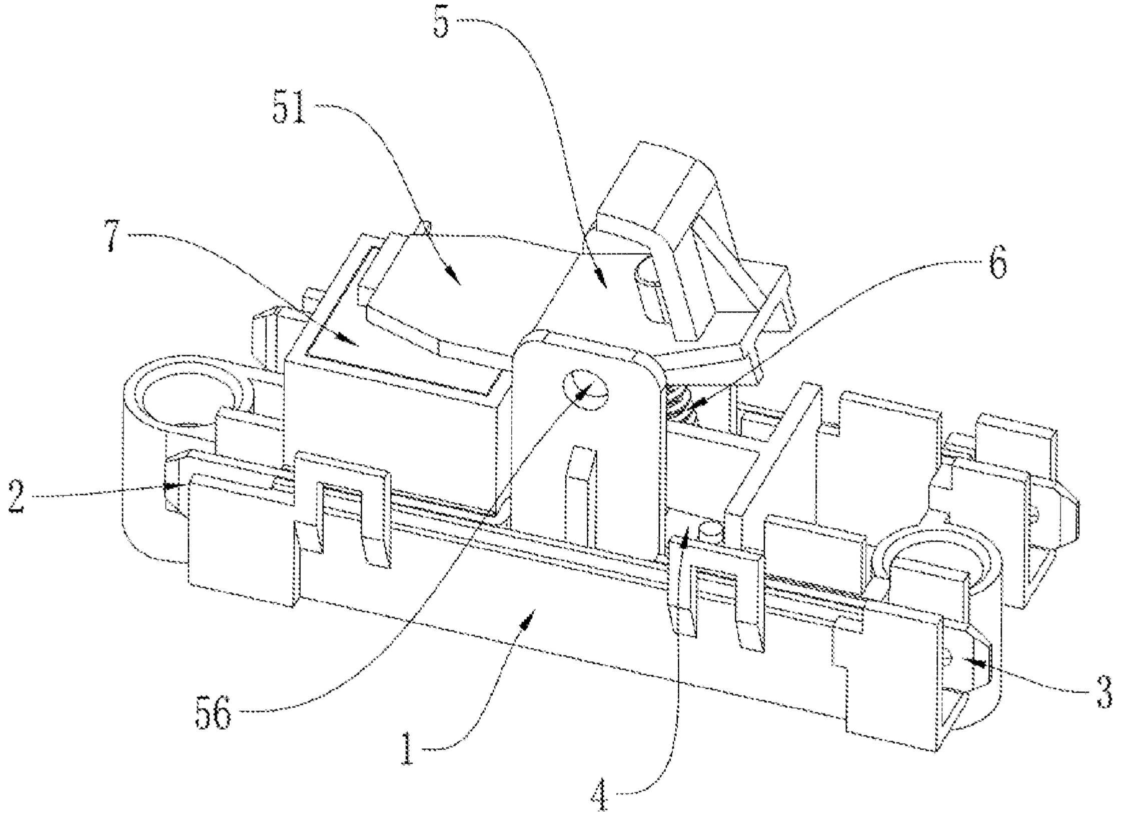
FIG. 2 is a schematic diagram illustrating a three-dimensional structure of the electromagnetic switch of the present invention after the upper cover is opened.

In Figures: 1—Base, 11—Bell, 12—Upper Cover, 121—Opening, 2—The Second Static Contact Piece, 21—The First Clamping Groove, 3—The Second Static Contact Piece, 4—Movable Contact Piece, 41—On-off Portion, 42—Shifting Portion, 43—Clamping Portion, 44—The Second Clamping Groove, 45—Transition Piece, 5—Movable Member, 51—The First Action Portion, 52—The Second Action Portion, 53—Spring Fixing Portion, 54—Striking Head, 55—The First Hook, 56—The First Rotating Shaft, 6—Intermediate Driving Member, 61—The First Spring, 7—Electromagnetic Driving Assembly, 71—Coil, 72—Magnetic Core, 8—Timer, 81—Control Voltage Output Terminal, 82—Circuit Board, 83—Time-adjustment Potentiometer, 831—Adjustment Hole, 84—Button Switch, 85—Indicator Light, 91—Shell, 92—Handle, 921—Pressing Portion, 922—The Second Hook, 93—The Second Spring, 94—Time-adjustment Knob, 941—Light-guide Rotating Shaft Assembly, 9411—Light-guide Shaft, 9412—Light-guide Head, 9413—Circumferential Limiting Groove, 95—Light-transmitting Hole, 951—Light-transmitting Column, 96—Time-adjustable Controller, 97—Fixing Hole, 971—Circumferential Limiting Strip, 972—Limiting Step, 98—Pressing Guide Surface.

The implementation, functional features, and advantages of the present invention are further explained hereinafter in combination with the embodiments and drawings.

DETAILED DESCRIPTION

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

It should be noted that, if terms for indicating directions are involved in the embodiments of the present invention, such as "up", "down", "left", "right", "front" and "rear" etc., these terms are merely used to illustrate relative position relationships or motion situations among the components in a specific manner. When the specific manner varies, the directional indications vary accordingly.

In addition, the terms "first" and "second" are used for descriptive purposes only and cannot be understood as the indication or implication of relative importance or the implication of the number of indicated technical features. Thus, a technical feature defined as "first" or "second" may explicitly or implicitly comprises one or more technical features. In addition, the technical solutions among various embodiments may be combined when they can be realized by those skilled in the art. When these technical solutions conflict or cannot be realized after being combined, it should be considered that the combination of these technical solutions does not exist and is not within the scope defined by the claims of the present invention.

As shown in FIGS. 1-11, an electromagnetic switch comprises a base 1, wherein a first static contact piece 2, a second static contact piece 3, a movable contact piece 4, a movable member 5, an intermediate driving member 6 and an electromagnetic driving assembly 7 are arranged on the base 1.

The first static contact piece 2 and the second static contact piece 3 are fixed on the base 1, and the second static contact piece 3 is spaced apart from the first static contact piece 2. More specifically, one end of the first static contact piece 2 and one end of the second static contact piece 3 that are away from each other extend out from the base 1 and are connected to an external circuit. One end of the first static contact piece 2 and one end of the second static contact piece 3 that are close to each other are connected or disconnected through the movable contact piece 4. When the first static contact piece 2 and the second static contact piece 3 are disconnected, the external circuit does not operate, and when the first static contact piece 2 and the second static contact piece 3 are connected, the external circuit operates. One first static contact piece 2 and one second static contact piece 3 form a contact piece group, and when two or more contact piece groups are arranged, a plurality of circuits are switched on/off. For example, when there are two contact piece groups, one contact piece group is connected to a fire wire, wherein the first static contact piece 2 of the contact piece group is connected to an L pole for supplying power, and the second static contact piece 3 is connected to a Lo pole inside an electric appliance. The other contact piece group is connected to a null wire, wherein the first static contact piece 2 of the other contact piece group is connected to an N pole for supplying power, and the second static contact piece 3 is connected to a No pole inside the electric appliance. In this way, when the first static contact piece 2 and the second static contact piece 3 are connected, the electrical appliance is powered on.

The movable contact piece 4 is arranged between the first static contact piece 2 and the second static contact piece 3. The movable contact piece 4 is a conductor, and the movable contact piece 4 is electrically connected to the first static contact piece 2. The movable contact piece 4 comprises an on-off portion 41 capable of moving up and down, wherein the on-off portion 41 is arranged on an upper side of the second static contact piece 3, and the on-off portion 41 realizes an electrical connection or disconnection between the first static contact piece 2 and the second static contact piece 3. When there is a plurality of contact piece groups, the number of the movable contact piece 4 should be configured correspondingly.

The movable member 5 is rotatably connected to the base 1, wherein the movable member 5 is arranged on an upper side of the movable contact piece 4, the movable member 5 is an insulating member, and the movable member 5 comprises a first action portion 51. The first action portion 51 is arranged on one side of a rotating shaft connecting the movable member 5 and the base 1 that is close to the first static contact piece 2, and the rotating shaft connecting the movable member 5 and the base 1 is taken as the first rotating shaft 56.

The intermediate driving member 6 is arranged between the movable member 5 and the movable contact piece 4. An upper side of the intermediate driving member 6 is connected to the movable member 5, and a lower side of the intermediate driving member 6 is connected to the movable contact piece 4. The intermediate driving member 6 is configured to be capable of propelling the on-off portion 41 to move up and down along with the rotation of the movable member 5, so that the on-off portion 41 is capable of moving down to contact the second static contact piece 3 or moving up to be away from the second static contact piece 3.

The electromagnetic driving assembly 7 comprises a coil 71 and a magnetic core 72 capable of moving up and down, wherein the coil 71 is fixed on the base 1, and the magnetic core 72 is arranged on a lower side of the first action portion 51. When the coil 71 is not electrified, the magnetic core 72 is located at a lower position, and when the coil 71 is electrified, an upward magnetic force is generated to the magnetic core 72, so that the magnetic core 72 moves up to push the first action portion 51 up. When the coil 71 is not electrified, the coil 71 loses the magnetic force, the magnetic core 72 is not attracted such that it may automatically fall down or be pressed down. The arrangement of the coil 71 and the magnetic core 72 may follow an existing magnetomotive mechanism. For example, the coil 71 and the magnetic core 72 may be configured to be a direct-acting magnetomotive mechanism having a magnetic core 72 located on an inner side of the coil 71.

The first static contact piece 2 and the second static contact piece 3 are switched between an on state and an off state by means of the movable member 5, the intermediate driving member 6, the movable contact piece 4 and the electromagnetic driving assembly 7, wherein in an on state, the coil 71 is not electrified and the magnetic core 72 is at the lower position: at this point, the first action portion 51 is at the lower position, which enables the intermediate driving member 6 to propel the on-off portion 41 to move down to contact the second static contact piece 3, so that the first static contact piece 2 and the second static contact piece 3 are connected:

In an off state, the coil 71 is electrified to generate a magnetic force to attract the magnetic core 72 to move up: at this point, the upper side of the magnetic core 72 pushes the first action portion 51 up while enabling the movable member 5 to rotate, which allows the intermediate driving member 6 to propel the on-off portion 41 to move up to be away from the second static contact piece 3, so that the first static contact piece 2 and the second static contact piece 3 are disconnected: preferably, when the coil 71 is electrified, it only needs to be electrified for a very short period of time, such as giving a pulse voltage for 0.1-0.2 second, so that the magnetic core 72 moves up to push the first action portion 51 up. Certainly, the duration of electrifying the coil 71 may also be set according to actual needs.

When the electromagnetic switch is on, namely, when the first static contact piece 2 and the second static contact piece 3 are connected, the coil 71 is in a non-electrified state, and the movable contact piece 4 keeps the first static contact piece 2 and the second static contact piece 3 connected under the action of the movable member 5 and the intermediate driving member 6, so that the external circuit is kept on. When the electromagnetic switch needs to be off, the coil 71 is electrified for a short period of time to make the magnetic core 72 move, and the movable contact piece is separated from the second static contact piece 3 under the action of the movable member 5 and the intermediate driving member 6, which enables the first static contact piece 2 and the second static contact piece 3 to be disconnected such that the external circuit is switched off. The coil 71 in the electromagnetic switch of the present invention does not need to be electrified all the time when the circuit is on, and the coil 71 only needs to be electrified for a small period of time when the circuit is switched off. The heat generated by the coil 71 is very little such that it may be ignored. The surface of the silicon steel piece is not easy to rust, the normal on and off actions are ensured, and a prolonged functional life is achieved. In addition, in the present invention, the off state of the electromagnetic switch depends on the magnetic force generated by the coil 71, so that the prior problem relating to the failure of achieving a smooth disconnection caused by the residual magnetism of the electromagnet is effectively avoided.

In some embodiments, the intermediate driving member 6 is a first spring 61, an upper side of the movable contact piece 4 is provided with a shifting portion 42 for shifting the direction of the movable contact piece 4, and a lower side of the movable member 5 is provided with a spring fixing portion 53. An upper side of the first spring 61 is connected to the spring fixing portion 53, a lower side of the first spring 61 is connected to the shifting portion 42, and the first spring 61 is configured to change the force direction of the shifting portion 42 along with the rotation of the movable member 5 such that the direction of the shifting portion 42 is shifted.

Figure 7:
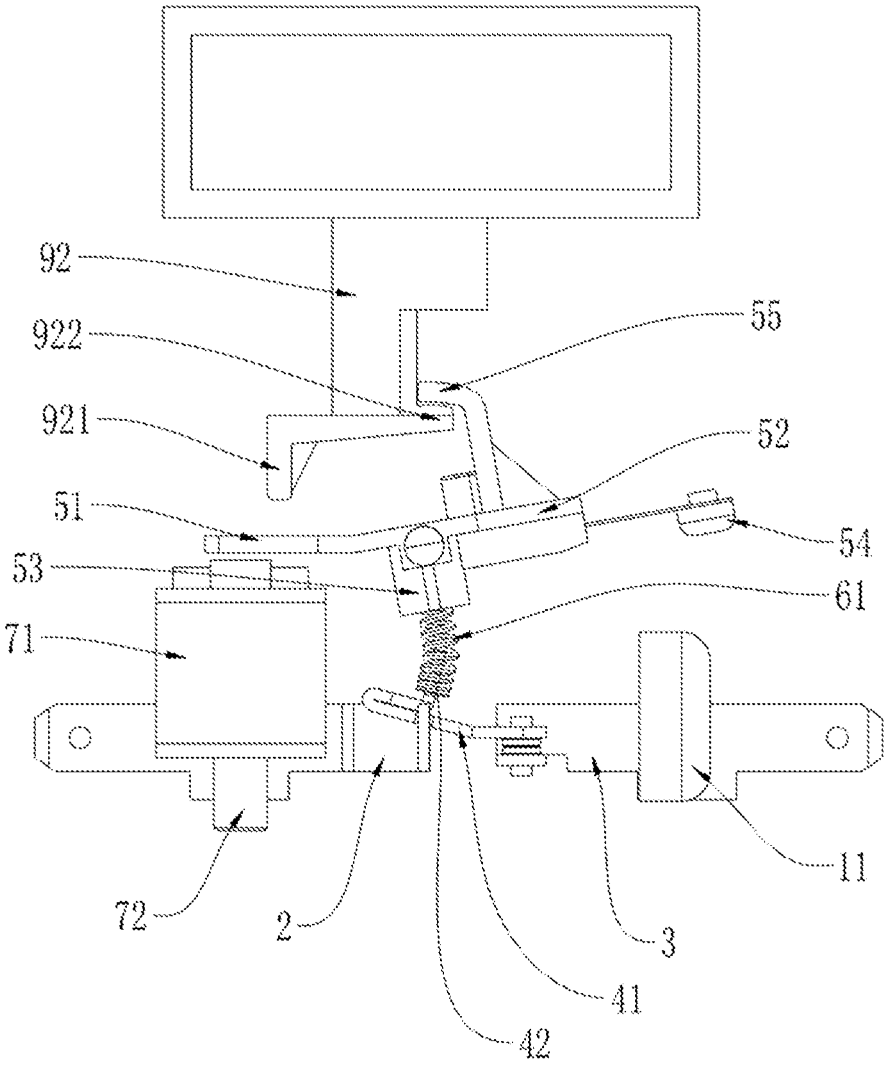
FIG. 7 is a schematic diagram illustrating a front view of the electromagnetic switch and the handle of the present invention when they are in an on state.

In an on state, as shown in FIG. 7, the movable member 5 forms a pressure towards the second static contact piece 3 on the first spring 61, thereby enabling the first spring 61 to propel the shifting portion 42 and the on-off portion 41 to move down to contact the second static contact piece 3. At this point, the middle portion of the first spring 61 curves and protrudes towards one side of the second static contact piece 3.

Figure 8:
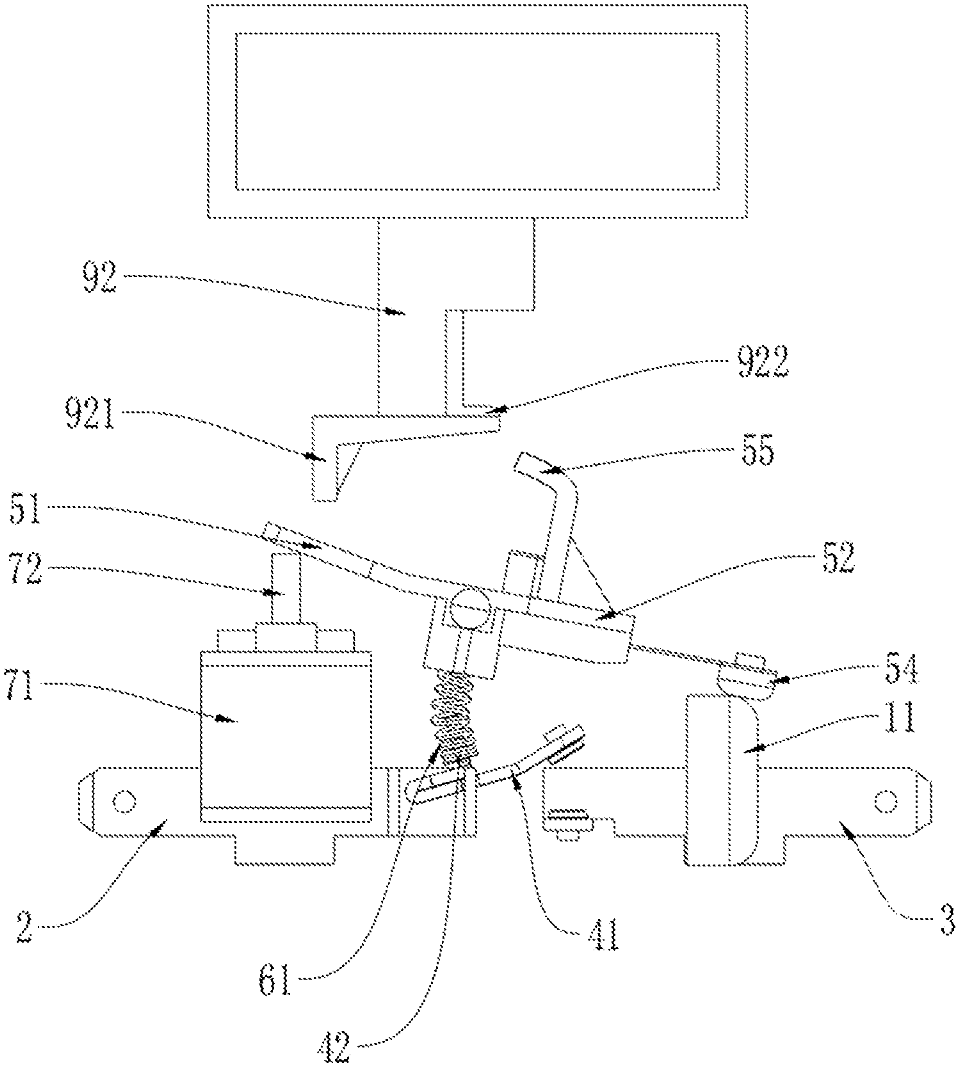
FIG. 8 is a schematic diagram illustrating a front view of the electromagnetic switch and the handle of the present invention when they are in an off state.

After being switched to an off state, as shown in FIG. 8, the movable member 5 forms a pressure towards the first static contact piece 2 on the first spring 61, thereby enabling the first spring 61 to propel the shifting portion 42 and the on-off portion 41 to move up to be away from the second static contact piece 3. At this point, the middle portion of the first spring 61 curves and protrudes towards one side of the first static contact piece 2.

The first spring 61 is connected between the movable member 5 and the movable contact piece 4, and when the movable piece 5 rotates, the force direction of the first spring 61 is changed, thereby propelling the movable contact piece 4 to move. By utilizing the elasticity and deformation ability of the first spring 61, the upper and lower sides of the first spring 61 are connected to the movable member 5 and the movable contact piece 4 while imposing an acting force, and the first spring 61 is capable of deforming along the variation of the position and posture of the movable member 5 and the movable contact piece 4. Thus, a simple structure is achieved.

Further, the spring fixing portion 53 is located on a lower side of the rotating shaft connected to the movable member 5 and the base 1, namely, the lower side of the first rotating shaft 56. This arrangement allows the direction of the acting force of the first spring 61 to be easily changed when the movable member 5 rotates. Preferably, the spring fixing portion 53 is located directly below the first rotating shaft 56, allowing the direction angle of the first spring 61 to be changed in a wider range.

Figure 9:
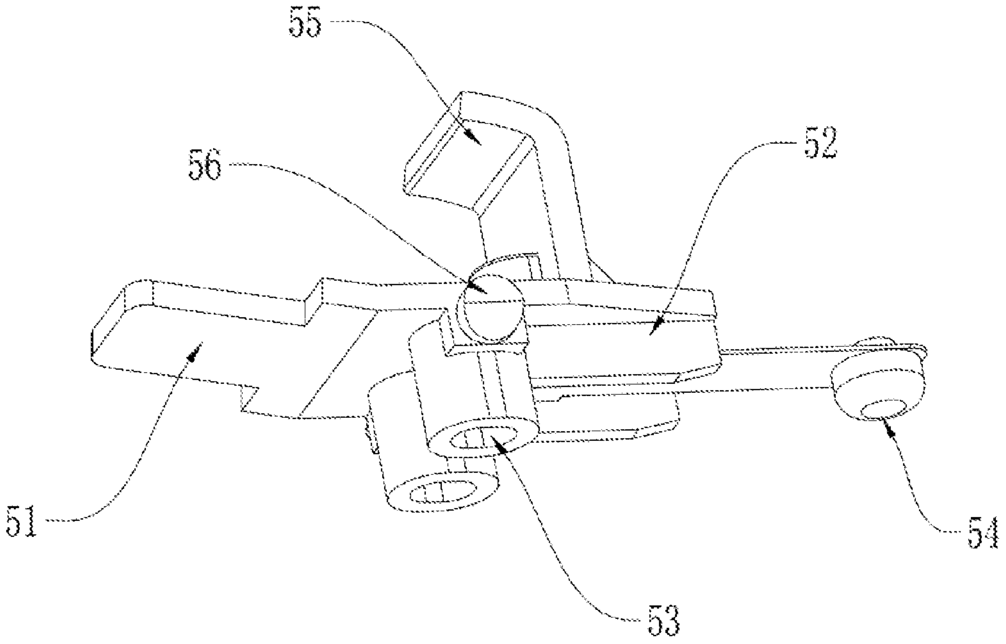
FIG. 9 is a schematic diagram illustrating an exemplary structure of the movable member of the present invention.
Figure 11:
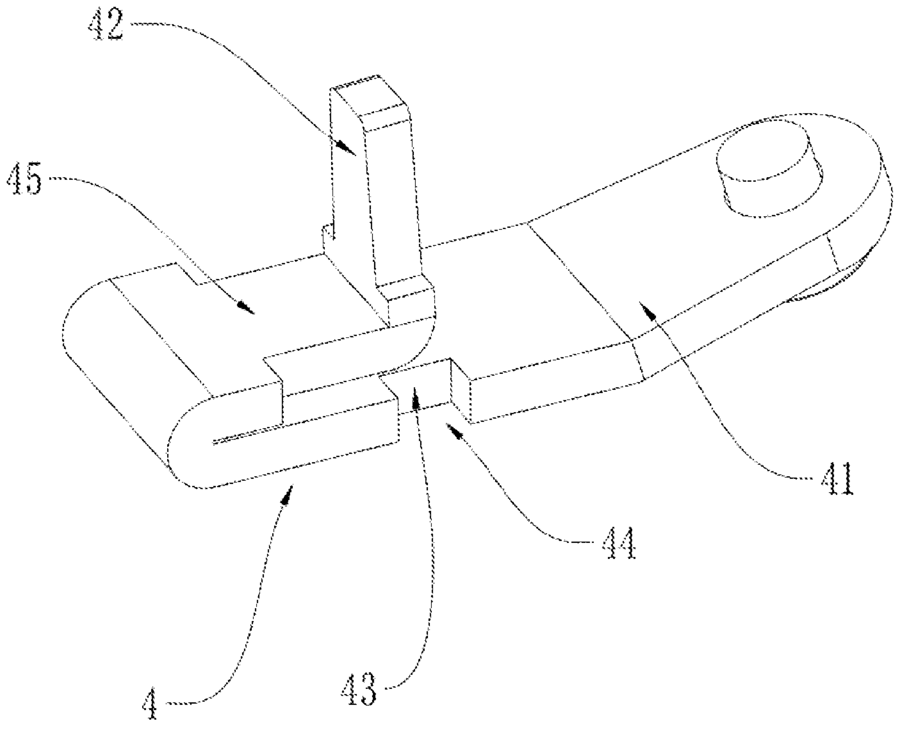
FIG. 11 is a schematic diagram illustrating an exemplary structure of the movable contact piece of the present invention.
Figure 12:
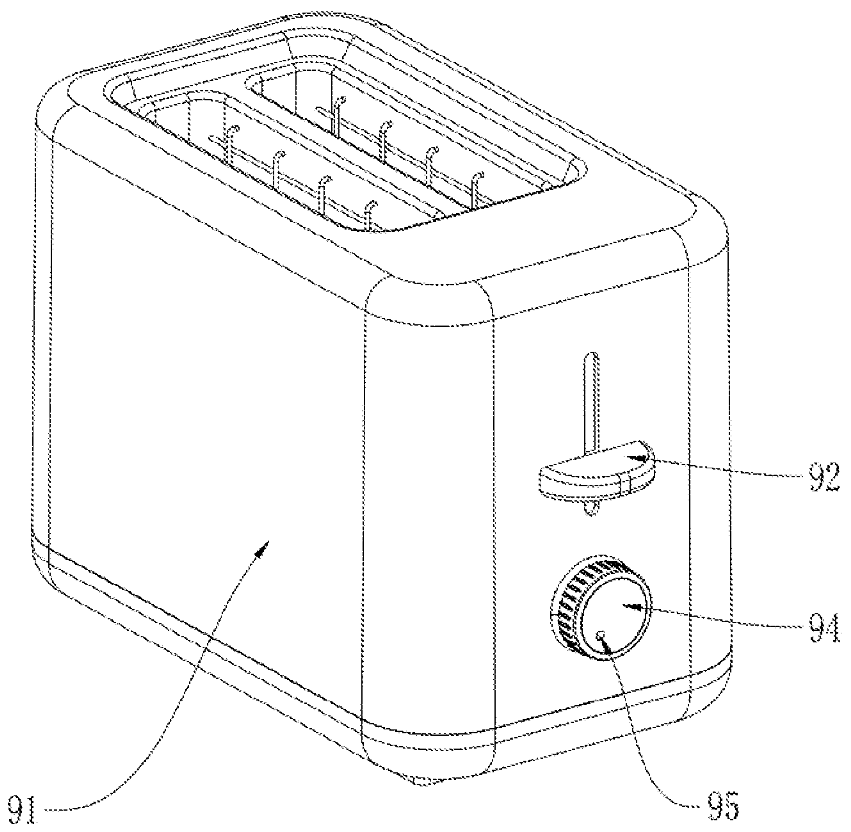
FIG. 12 is a schematic diagram illustrating an exemplary structure of the toaster of the present invention.
Figure 13:
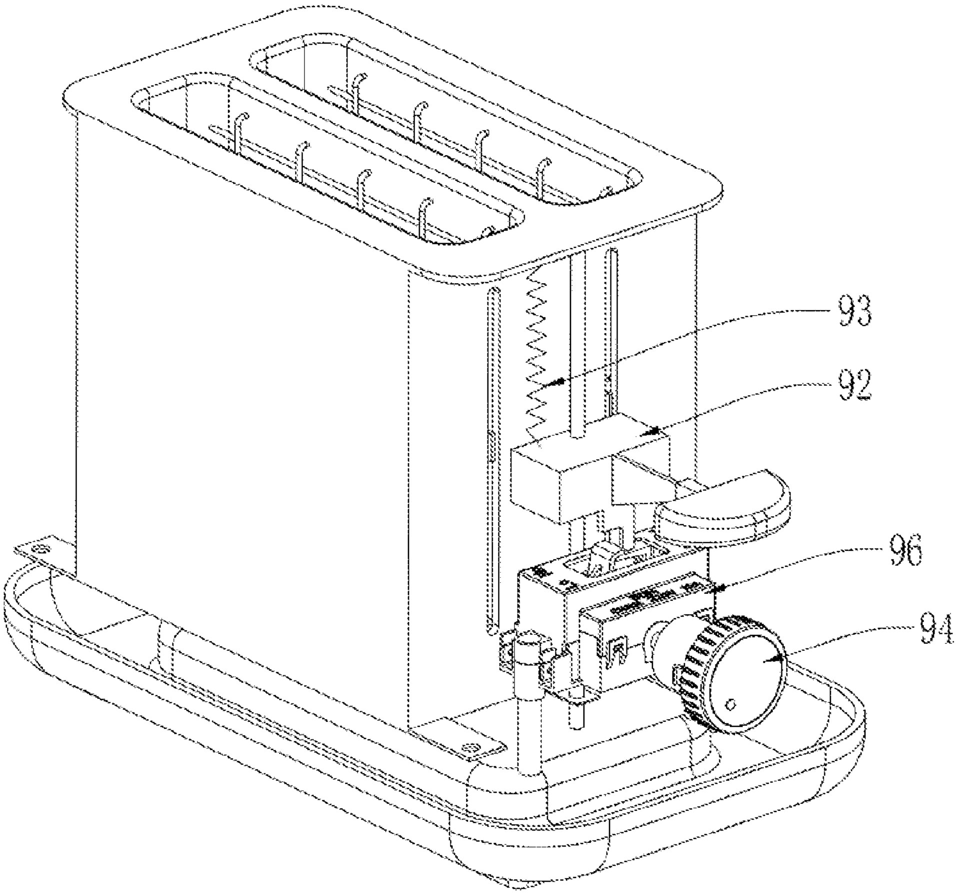
FIG. 13 is a schematic diagram illustrating an exemplary structure of the toaster of the present invention after the housing is removed.

Further, the shifting portion 42 is a shifting piece extending upwardly. As shown in FIG. 11, the shifting piece is inserted into the lower end of the first spring 61 for a certain distance, and the spring fixing portion 53 is a fixing hole 97. As shown in FIG. 9, an upper end of the first spring 61 is inserted into the fixing hole 97 for a certain distance, and when the movable member rotates, the fixing hole 97 enables the direction of an upper end of the first spring 61 to be changed. At this point, the first spring 61 is bent and deformed, and then a lower end of the first spring 61 enables the directions of the shifting piece and the on-off portion 41 to be changed. More specifically, when the first action portion 51 is at a lower position, both the fixing hole 97 and the shifting piece incline towards one side of the second static contact piece 3, and when the first action portion 51 is at an upper position, the fixing hole 97 and the shifting piece both incline towards one side of the first static contact piece 2. In some other embodiments, the shifting portion 42 may also be a hole, and the spring fixing portion 53 may also be a sheet as long as it can be connected to the first spring 61 to transmit a force.

In some embodiments, the movable contact piece 4 is rotatably connected to the first static contact piece 2, thereby allowing the on-off portion 41 to move up and down. Through this arrangement, the movable contact piece 4 is electrically connected to the first static contact piece 2. The movable contact piece 4 is electrified while rotating with the first static contact piece 2, so that the structure is significantly simplified. In some other embodiments, the movable contact piece 4 may also be arranged to rotate with the base 1, and the movable contact piece 4 is electrically connected to the first static contact piece 2 through a wire.

Further, the movable contact piece 4 is rotatably connected to the first static contact piece 2 at a position where the movable member 5 is connected to the base 1, which achieves ideal effect of variation of position and posture as well as force transmission among the movable member 5, the first spring 61 and the movable contact piece 4. Preferably, the movable contact piece 4 is rotatably connected to the first static contact piece 2 at a position right below the rotating shaft connecting the movable member 5 and the base 1.

Figure 10:
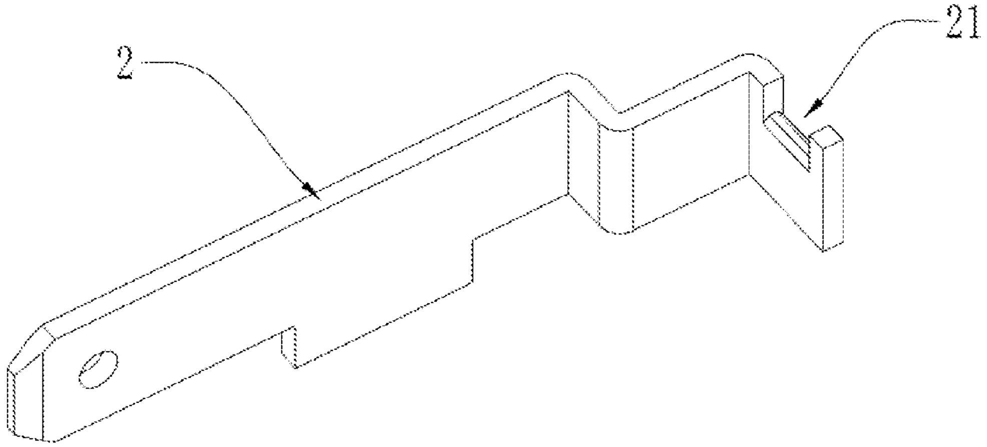
FIG. 10 is a schematic diagram illustrating an exemplary structure of the first static contact piece of the present invention.

Further, as shown in FIGS. 10 and 11, a side of the first static contact piece 2 close to the second static contact piece 3 is provided with a first clamping groove 21 with an upward opening, and the movable contact piece 4 is provided with a clamping portion 43. The clamping portion 43 is arranged in the first clamping groove 21 and is capable of swinging up and down. Second clamping grooves 44 are formed in two sides of the clamping portion 43, and the second clamping grooves 44 are clamped with the two sides of the first clamping groove 21 such that the movement of the movable contact piece 4 is limited. The on-off portion 41 is arranged on one side of the clamping portion 43 close to the second static contact piece 3, and the movable contact piece 4 and the first static contact piece 2 are rotatably connected and electrically connected through the clamping connection between the clamping portion 43 and the first clamping groove 21.

During assembly, the movable contact piece 4 is placed into the first clamping groove 21 from the position where the clamping portion 43 is located, so that the movable contact piece 4 is limited between the first static contact piece 2 and the second static contact piece 3. By means of the first spring 61, the movable contact piece 4 is pressed to contact the first static contact piece 2 to be electrified. Through adopting the aforesaid solution, a simple assembly is achieved. A gap for allowing the movable contact piece 4 to swing is provided between the clamping portion 43, the first clamping groove 21 and the second clamping groove 44. Through the clamping connection of the clamping portion 43, the second clamping groove 44 and the first clamping groove 21, the first static contact piece 2 supports the movable contact piece 4, and when the first spring 61 changes the force direction of the shifting portion 42, the movable contact piece 4 rotates up and down. Meanwhile, the movable contact piece 4 is limited between the first static contact piece 2 and the second static contact piece 3. The first spring 61 presses the movable contact piece 4 down in the first clamping groove 21 to keep the movable contact piece 4 in contact with the first static contact piece 2, so that the movable contact piece 4 is electrified. Thus, a simple structure is realized.

In some embodiments, as shown in FIG. 11, a transition piece 45 is arranged on an upper side of one end of the movable contact piece 4 close to the first static contact piece 2. The transition piece 45 extends towards one side of the second static contact piece 3, and the shifting portion 42 is arranged on one side of the transition piece 45 close to the second static contact piece 3.

Under the acting force of the first spring 61, the shifting portion 42 acts on an end portion of one side of the movable contact piece 4 close to the first static contact piece 2, thereby enabling the movable contact piece 4 to easily move according to the acting force of the first spring 61.

Further, the shifting portion 42 is arranged on an upper side of the position where the movable contact piece 4 and the first static contact piece 2 are rotatably connected. In this way, ideal effect of force transmission among the first spring 61, the shifting portion 42 and the movable contact piece 4 is achieved.

In some embodiments, the movable portion 5 further comprises a second action portion 52, wherein the first action portion 51 and the second action portion 52 are respectively arranged on two sides of the rotating shaft connected to the movable member 5 and the base 1. The base 1 is further provided with a bell 11, and one side of the second action portion 52 away from the first action portion 51 is provided with a striking head 54. The striking head 54 is arranged at a position corresponding to the bell 11, and when the second action portion 52 rotates down, the striking head 54 is capable of striking the bell 11.

When the operation is completed, at this point, the coil 71 passes through the magnetic core 72 to push the first action portion 51 up, the second action portion 52 rotates down, and the striking head 54 strikes the bell 11 to produce a prompt sound, thereby notifying a user that the operation is completed.

In some embodiments, the electromagnetic switch further comprises an upper cover 12 arranged on an upper side of the base 1, and the first static contact piece 2, the second static contact piece 3, the movable contact piece 4, the movable member 5 and the electromagnetic driving assembly 7 are all arranged between the base 1 and the upper cover 12. The upper cover 12 is provided with an opening 121, and the opening 121 is formed on an upper side of the movable member 5. The first static contact piece 2, the second static contact piece 3 and the electromagnetic driving assembly 7 are arranged in the base 1 and the upper cover 12, so that effects of shielding and protection are achieved. The coil 71 and the magnetic core 72 of the electromagnetic driving assembly 7 are not directly exposed, which effectively protects the electromagnetic driving assembly 7 from rusting after being touched by hand.

Figure 3:
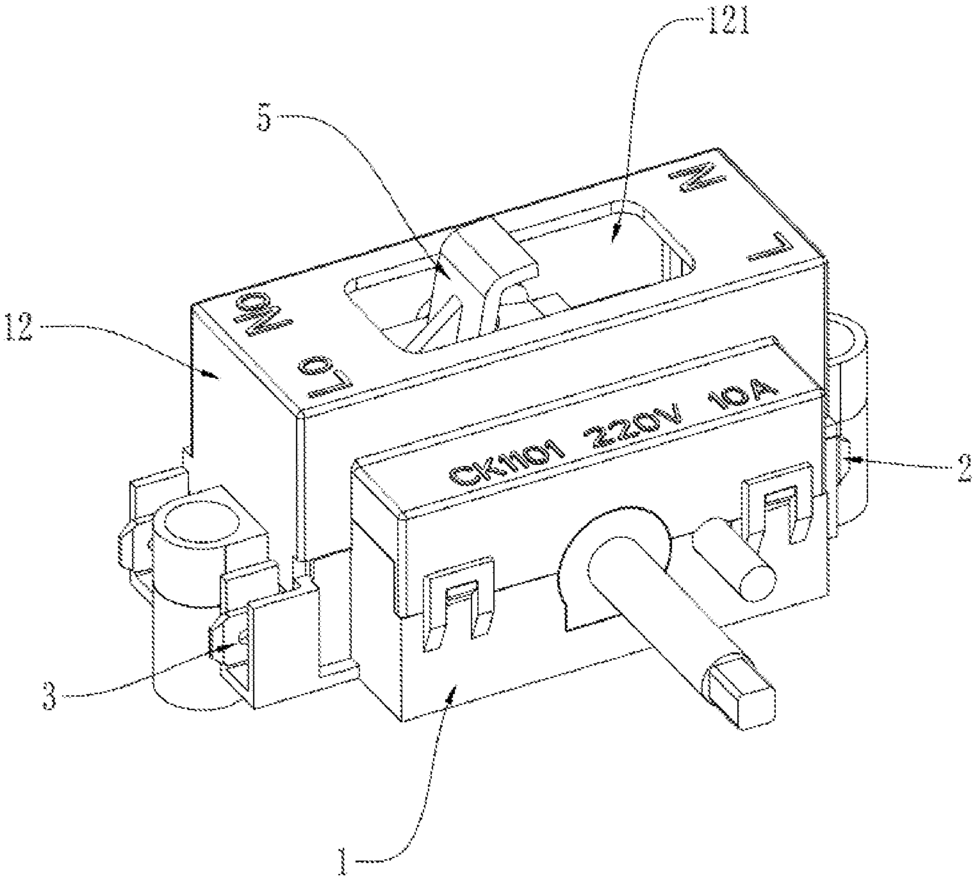
FIG. 3 is a schematic diagram illustrating a three-dimensional structure of another side of the electromagnetic switch and the time-adjustable controller of the present invention.
Figure 4:
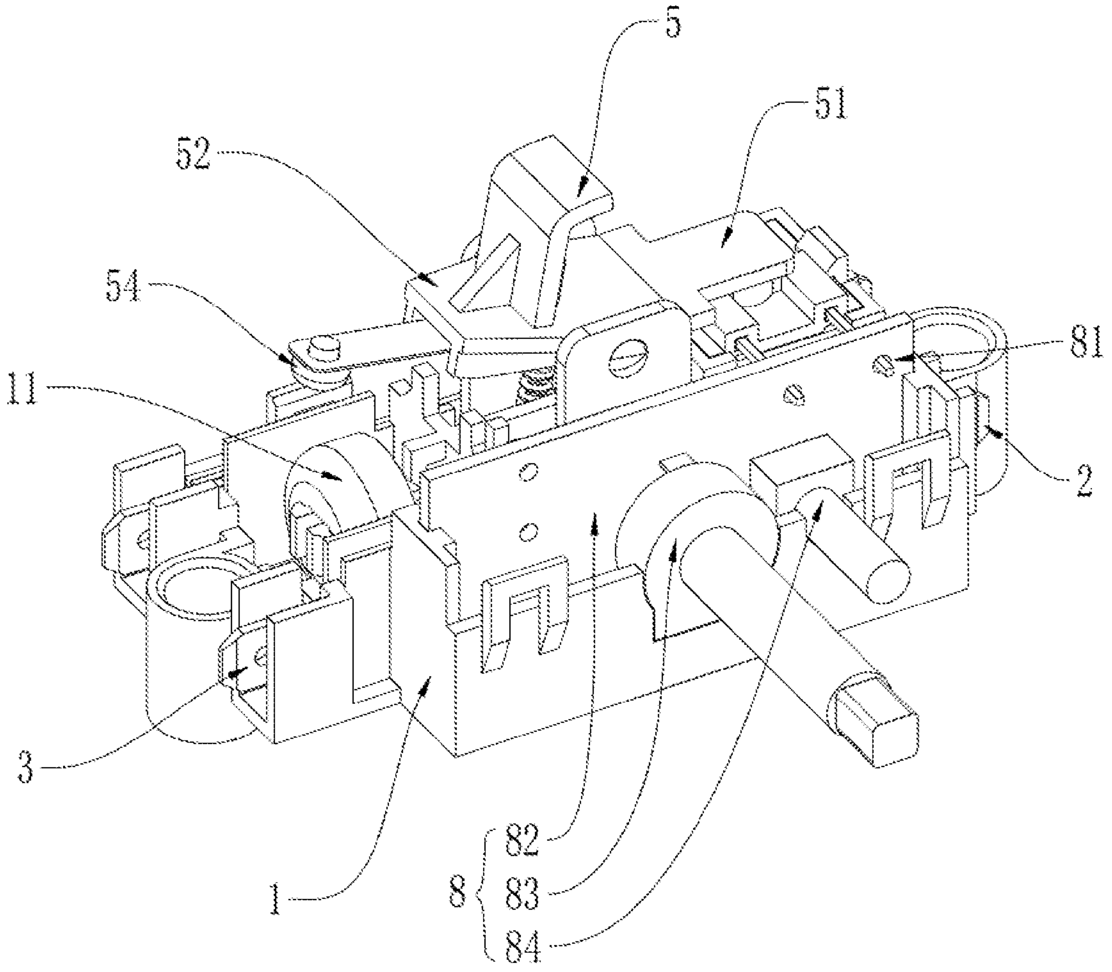
FIG. 4 is a schematic diagram illustrating a three-dimensional structure of another side of the electromagnetic switch and the time-adjustable controller of the present invention after the upper cover is opened.
Figure 5:
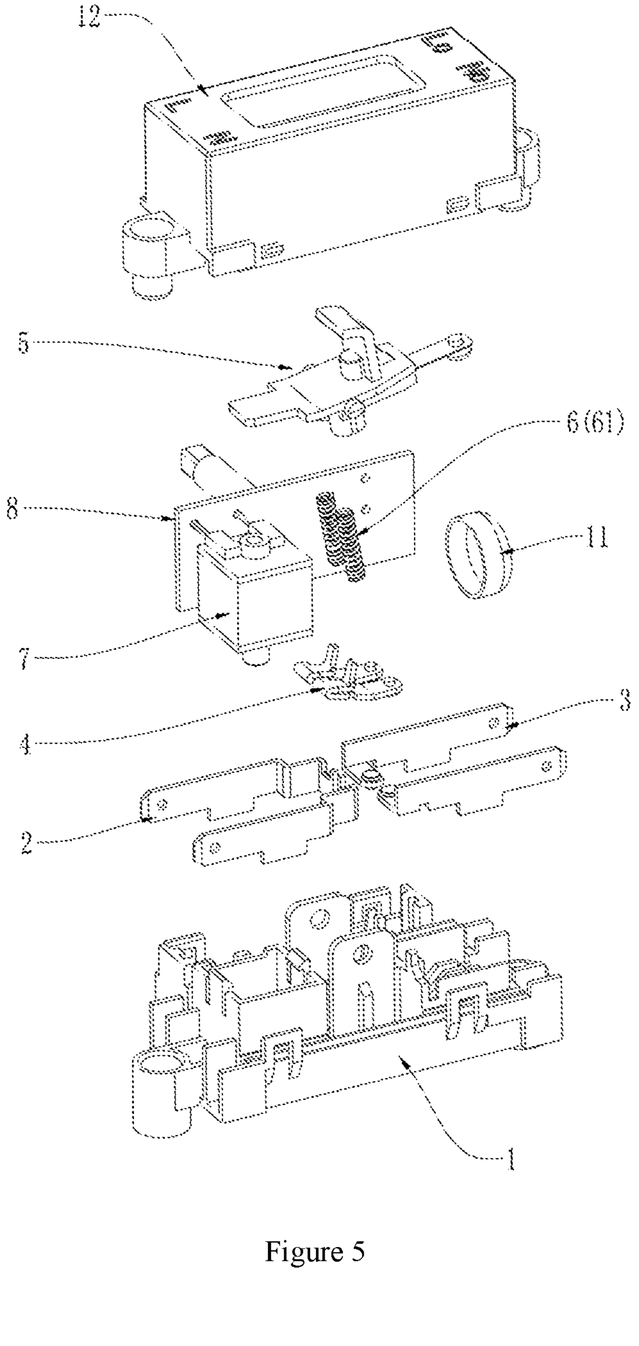
FIG. 5 is a schematic diagram illustrating an explosive view of the time-adjustable controller of the present invention.
Figure 6:
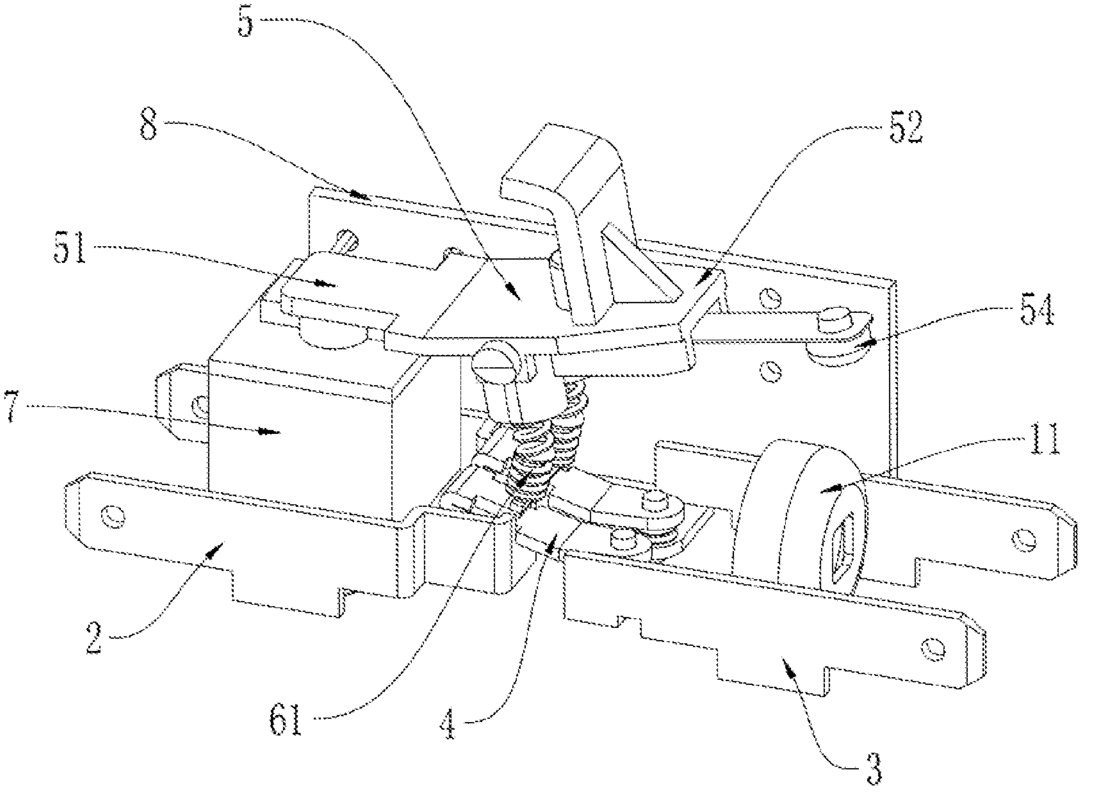

Moreover, as shown in FIGS. 3 and 4, a time-adjustable controller 96 having the aforesaid electromagnetic switch of the present invention further comprises a timer 8. The timer 8 is provided with a control voltage output terminal 81, and the control voltage output terminal 81 is electrically connected to the coil 71. The timer 8 is configured to control the control voltage output terminal 81 to output a voltage to the coil 71 when a preset period is reached.

Through adopting the aforesaid electromagnetic switch, when the time-adjustable controller 96 operates, the timer 8 is initiated, and when the preset duration is reached, the control voltage output terminal 81 is controlled to output a voltage to the coil 71 such that the coil is electrified. At this point, the magnetic core 72 acts to turn off the electromagnetic switch. When the time-adjustable controller 96 operates, the coil 71 is not electrified such that the heat generated is low. The timer 8 may adopt traditional modules with functions including time adjustment, timing, and output control.

In addition, as shown in FIGS. 12-16, a toaster having the aforesaid time-adjustable controller 96 of the present invention further comprises a housing 91 and a handle 92 capable of moving up and down. The time-adjustable controller 96 is arranged in the housing 91, and the lower side of the handle 92 is capable of pressing the first action portion 51 of the movable member 5 down.

Through adopting the aforesaid time-adjustable controller 96, after the handle 92 is pressed down, the toaster starts to operate such that the baking and timing functions are initiated. When the preset duration is reached, the coil 71 is switched off and the toaster stops. During the operation of the toaster, the coil 71 is not electrified, so that the heat generated by the coil 71 becomes less.

In some embodiments, the toaster further comprises a second spring 93 connected to the handle 92, and the movable member 5 further comprises a second action portion 52. The first action portion 51 and the second action portion 52 are respectively arranged on two sides of the rotating shaft connected to the movable member 5 and the base 1. An upper side of the second action portion 52 is provided with a first hook 55, and a lower side of the handle 92 is provided with a pressing portion 921 and a second hook 922. The pressing portion 921 is arranged on an upper side of the first action portion 51, and the pressing portion 921 is configured to press the first action portion 51 down. The second hook 922 is configured to be hooked with the first hook 55 when the first action portion 51 is pressed down, and the second spring 93 is capable of imposing an upward pulling force on the pressed handle 92.

When the handle 92 is pressed by a user, the second spring 93 is stretched, the pressing portion 921 of the handle 92 presses the first action portion 51 down, and the second action portion 52 rotates up. At this point, the first hook 55 and the second hook 922 are hooked with each other, and the toaster starts to operate. After the handle 92 is released, the second spring 93 pulls the handle 92 up. Because the first hook 55 and the second hook 922 are hooked with each other, the handle 92 pulls the second action portion 52 up, and the movable member 5 limits the upward movement of the handle 92. Therefore, the movable member 5 and the electromagnetic switch are kept in an operating state, and the toaster keeps operating. After the toaster is stopped, the first action portion 51 is pushed up, the second action portion 52 rotates down, the first hook 55 and the second hook 922 are separated, and the handle 92 moves up under the tension force of the second spring 93.

In some embodiments, the timer 8 comprises a circuit board 82, and the circuit board 82 is provided with a time-adjustment potentiometer 83 and an indicator light 85. The housing 91 is provided with a time-adjustment knob 94 connected to the time-adjustment potentiometer 83. Through adjusting the time-adjustment potentiometer 83 by the time-adjustment knob 94, the operation duration may be preset. The time-adjustment knob 94 is provided with a light-transmitting hole 95 for allowing the light rays emitted by the indicator light 85 to pass through. The control voltage output terminal 81 is arranged on the circuit board 82, and when the preset duration is reached, the control voltage output terminal 81 is controlled to output a voltage to the coil 71.

Through adjusting the time-adjustment potentiometer 83 by the time-adjustment knob 94, the operation duration may be preset. The indicator light 85 is capable of emitting light, and the light is emitted to the exterior of the toaster through the light-transmitting hole 95 to indicate the on-off state and/or the adjustment position.

Figure 14:
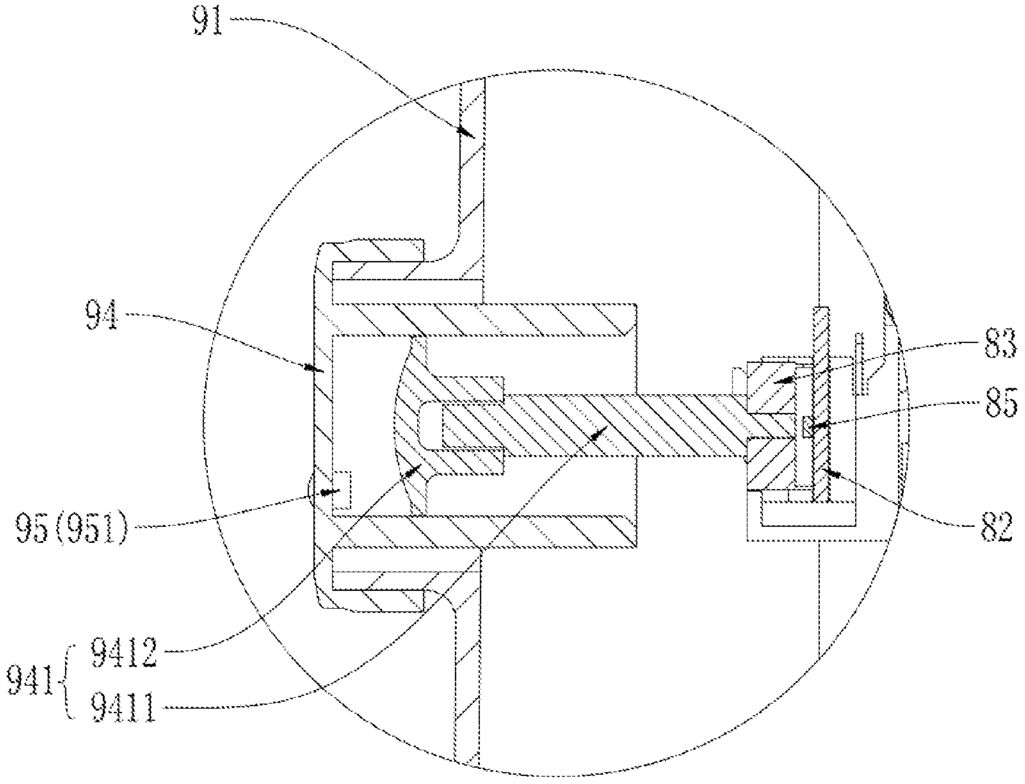
FIG. 14 is a schematic diagram illustrating a sectional view of a partial structure of the time-adjustment knob, the light-guide shaft and the indicator light of the present invention.
Figure 15:
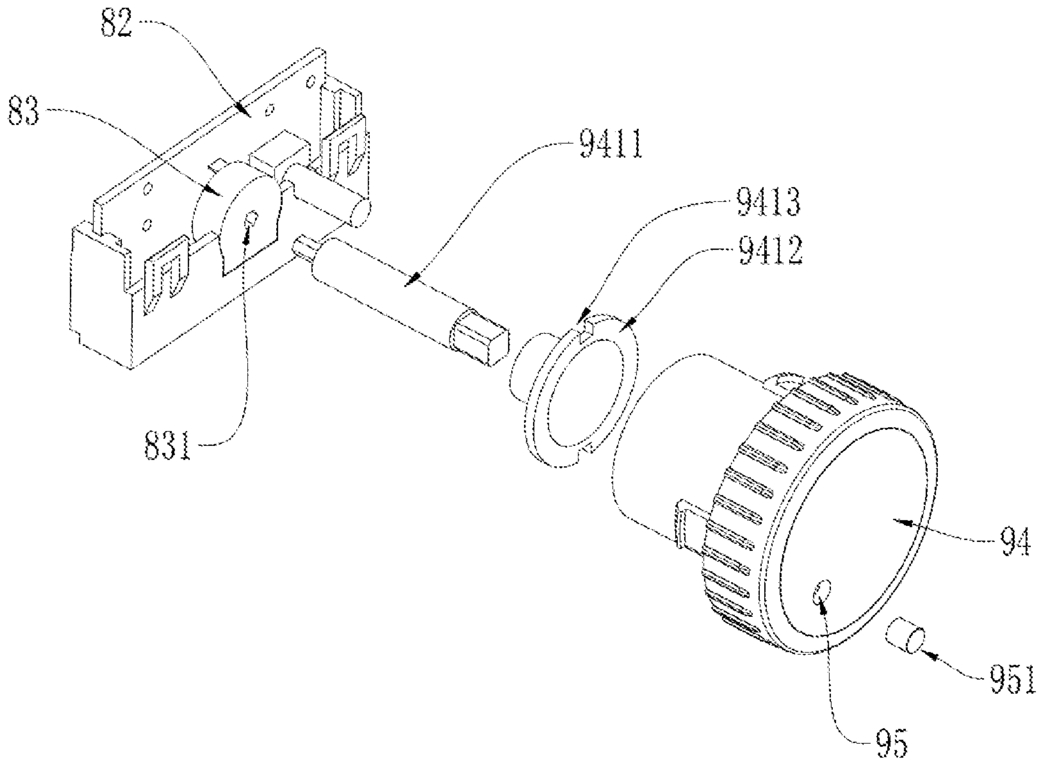
FIG. 15 is a schematic diagram illustrating an explosive view of the time-adjustment knob and the light-guide rotating shaft assembly of the present invention.

Further, as shown in FIGS. 14 and 15, the toaster further comprises a light-guide rotating shaft assembly 941, and the light-guide rotating shaft assembly 941 is arranged between the time-adjustment knob 94 and the indicator light 85. One end of the light-guide rotating shaft assembly 941 close to the time-adjustment knob 94 is fixedly connected to the time-adjustment knob 94, and one end of the light-guide rotating shaft assembly 941 close to the indicator light 85 is directly opposite to the indicator light 85. The light-guide rotating shaft assembly 941 is coaxially arranged with the time-adjustment knob 94, and the light-guide rotating shaft assembly 941 is made of a light-guide material, thereby allowing the light emitted by the indicator light 85 to pass through the light-transmitting hole 95 via the light-guide rotating shaft assembly 941 and is emitted to the exterior of the time-adjustment knob 94. The time-adjustment potentiometer 83 is arranged on one side of the indicator light 85 close to the time-adjustment knob 94, an adjustment hole 831 is formed in the time-adjustment potentiometer 83, and the indicator light 85 is directly opposite to the adjustment hole 831. One side of the light-guide rotating shaft assembly 941 close to the indicator light 85 is inserted into the adjustment hole 831, and the light-transmitting hole 95 and the rotation center of the time-adjustment knob 94 are arranged in a staggered manner. A light-transmitting column 951 may be arranged in the light-transmitting hole 95, and the light-transmitting column 951 may partially protrude from an outer side of the time-adjustment knob 94. When there are light rays, the light-transmitting column 951 emits light, and the light-transmitting column 951 is capable of guiding light to the exterior of the time-adjustment knob 94, so that better light-emitting effect is achieved.

When the time-adjustment knob 94 is connected to the time-adjustment potentiometer 83 through the light-guide rotating shaft assembly 941, the adjustment hole 831 of the time-adjustment potentiometer 83 may be rotated to adjust the time-adjustment potentiometer 83. The light is guided to the light-transmitting hole 95 of the time-adjustment knob 94 through the light-guide rotating shaft assembly 941, and the indicator light 85 is arranged inside the time-adjustment potentiometer 83. By making the light-guide rotating shaft assembly 941 connected to the time-adjustment knob 94 a medium for guiding light, it is unnecessary to arrange an additional light-guide structure, achieving a simple structure, reducing the cost of the time-adjustment knob 94, and lowering the space occupation. Meanwhile, the time-adjustment potentiometer 83 does not impede the guiding of light, the light-transmitting hole 95 is still capable of receiving the light emitted by the indicator light 85 and the brightness is basically kept uniform. Moreover, it is unnecessary to consider whether the rotated light-transmitting hole 95 is directly opposite to the indicator light 85.

Further, the light-guide rotating shaft assembly 941 comprises a light-guide shaft 9411 and a light-guide head 9412, wherein one end of the light-guide shaft 9411 is inserted into the adjustment hole 831, and the other end of the light-guide shaft 9411 is fixedly connected to the light-guide head 9412. The diameter of the light-guide head 9412 is greater than the diameter of the light-guide shaft 9411, the light-guide head 9412 is fixedly connected to an inner side of the time-adjustment knob 94, and the light-transmitting hole 95 is directly opposite to the light-guide head 9412. The light-guide shaft 9411 is connected to the time-adjustment potentiometer 83, the light generated by the indicator light 85 is first irradiated to the light-guide shaft 9411 and then transmitted to the light-guide head 9412 for increasing the range of irradiation. The diameter of the light-guide head 9412 extends to the position of the light-transmitting hole 95, so that the material of the light-guide rotating shaft assembly 941 is greatly saved. In some embodiments, the cross section of an end of the light-guide shaft 9411 is configured to be non-circular and is inserted into the light-guide head 9412, so that the light-guide shaft 9411 and the light-guide head 9412 are circumferentially fixed.

Further, the light-guide rotating shaft assembly 941 is made of a light-guide material such as acrylic or polycarbonate such that an ideal light-guide performance is achieved.

Figure 16:
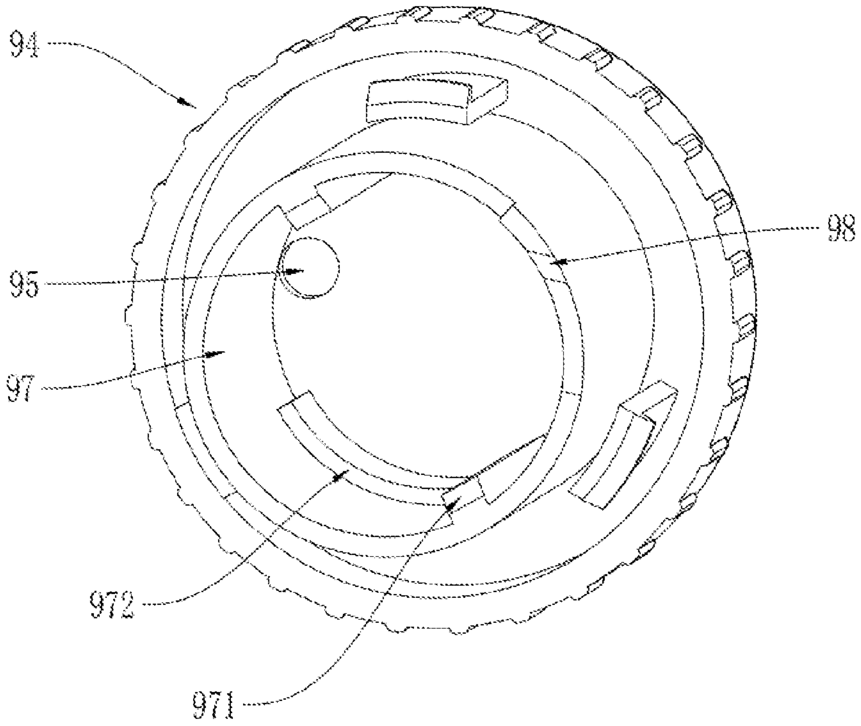
FIG. 16 is a schematic diagram illustrating an exemplary structure of the inner side of the time-adjustment knob of the present invention.

Further, as shown in FIG. 16, an inner side of the time-adjustment knob 94 is provided with a fixing hole 97, and the light-transmitting hole 95 is in communication with the fixing hole 97. One side of the fixing hole 97 close to the light-transmitting hole 95 is provided with a positioning step 972, and the light-guide head 9412 abuts against the positioning step 972. A circumferential limiting strip 971 is arranged on a side wall of the fixing hole 97, a circumferential limiting groove 9413 is formed in an outer side of the light guide head 9412, and the circumferential limiting strip 971 is arranged in the circumferential limiting groove 9413. The light-guide shaft 9411 and the positioning step 972 define an axial position of the light-guide head 9412, and the circumferential limiting strip 971 of the time-adjustment knob 94 is inserted into the circumferential limiting groove 9413 of the light-guide head 9412. When the time-adjustment knob 94 is rotated, the light-guide head 9412 and the light-guide shaft 9411 are propelled to rotate, achieving a convenient assembly. In some other embodiments, the time-adjustment knob 94 and the light-guide head 9412 may also be fixed by using screws or fastening structures.

In some embodiments, the timer 8 further comprises a button switch 84, and an inner side of the time-adjustment knob 94 is provided with a pressing guide surface 98 corresponding to the button switch 84. After the time-adjustment knob 94 is rotated to adjust the time-adjustment potentiometer 83, the time-adjustment knob 94 slowly rotates to reset during operation. When the preset duration is reached, A portion of the pressing guide surface 98 facing the button switch 84 protrudes, and the protruding portion presses the button switch 84. At this point, the button switch 84 is pressed to generate an end signal, and the control voltage output terminal 81 is controlled to output a voltage to the coil 71.

The aforesaid are merely preferred embodiments of the present invention and are not intended to limit the scope of the present invention. Any equivalent replacement made by using the description and drawings of the present invention, or direct/indirect application of the present invention in other related technical fields, shall fall into the scope defined by the claims of the present invention.

The invention claimed is:

1. An electromagnetic switch, comprising:

a base (1), a first static contact piece (2), a second static contact piece (3), a movable contact piece (4), a movable member (5), an intermediate driving member (6), and an electromagnetic driving assembly (7), wherein the first static contact piece (2) and the second static contact piece (3) are fixed on the base (1), and the second static contact piece (3) is spaced apart from the first static contact piece (2), wherein the movable contact piece (4) is arranged between the first static contact piece (2) and the second static contact piece (3), wherein the movable contact piece (4) is electrically connected to the first static contact piece (2), wherein the movable contact piece (4) further comprises an on-off portion (41), wherein the on-off portion (41) is arranged on an upper side of the second static contact piece (3), wherein the movable member (5) is rotatably connected to the base (1), wherein the movable member (5) is arranged on an upper side of the movable contact piece (4), wherein the movable member (5) further comprises a first action portion (51), wherein the first action portion (51) is arranged on one side of a rotating shaft connecting the movable member (5) and the base (1) that is close to the first static contact piece (2), wherein the intermediate driving member (6) is arranged between the movable member (5) and the movable contact piece (4), wherein an upper side of the intermediate driving member (6) is connected to the movable member (5), and a lower side of the intermediate driving member (6) is connected to the movable contact piece (4), wherein the intermediate driving member (6) is configured to be capable of propelling the on-off portion (41) to move up and down along with the rotation of the movable member (5), so that the on-off portion (41) is capable of moving down to contact the second static contact piece (3) or moving up to be away from the second static contact piece (3), wherein the electromagnetic driving assembly (7) further comprises a coil (71) and a magnetic core (72) capable of moving up and down, wherein the coil (71) is fixed on the base (1), and the magnetic core (72) is arranged on a lower side of the first action portion (51), wherein when the coil (71) is electrified, the magnetic core (72) moves up to push the first action portion (51) up, wherein the first static contact piece (2) and the second static contact piece (3) are switched between an on state and an off state by means of the movable member (5), the intermediate driving member (6), the movable contact piece (4) and the electromagnetic driving assembly (7), wherein in an on state, the coil (71) is not electrified and the magnetic core (72) is at the lower position, wherein at this point, the first action portion (51) is at the lower position, which enables the intermediate driving member (6) to propel the on-off portion (41) to move down to contact the second static contact piece (3), so that the first static contact piece (2) and the second static contact piece (3) are connected, wherein in an off state, the coil (71) is electrified to generate a magnetic force to attract the magnetic core (72) to move up, wherein at this point, the upper side of the magnetic core (72) pushes the first action portion (51) up while enabling the movable member (5) to rotate, which allows the intermediate driving member (6) to propel the on-off portion (41) to move up to be away from the second static contact piece (3), so that the first static contact piece (2) and the second static contact piece (3) are disconnected.

2. The electromagnetic switch of claim 1, wherein the intermediate driving member (6) is a first spring (61), an upper side of the movable contact piece (4) is provided with a shifting portion (42) for shifting the direction of the movable contact piece (4), and a lower side of the movable member (5) is provided with a spring fixing portion (53), wherein an upper side of the first spring (61) is connected to the spring fixing portion (53), a lower side of the first spring (61) is connected to the shifting portion (42), and the first spring (61) is configured to change the force direction of the shifting portion (42) along with the rotation of the movable member (5) such that the direction of the shifting portion (42) is shifted, wherein in an on state, the movable member (5) forms a pressure towards the second static contact piece (3) on the first spring (61), thereby enabling the first spring (61) to propel the shifting portion (42) and the on-off portion (41) to move down to contact the second static contact piece (3), wherein after being switched to an off state, the movable member (5) forms a pressure towards the first static contact piece (2) on the first spring (61), thereby enabling the first spring (61) to propel the shifting portion (42) and the on-off portion (41) to move up to be away from the second static contact piece (3).

3. The electromagnetic switch of claim 2, wherein the movable contact piece (4) is rotatably connected to the first static contact piece (2), thereby allowing the on-off portion (41) to move up and down, wherein the movable contact piece (4) is electrically connected to the first static contact piece (2) at a position where the movable contact piece (4) is rotatably connected to the first static contact piece (2).

4. The electromagnetic switch of claim 3, wherein one side of the first static contact piece (2) close to the second static contact piece (3) is provided with a first clamping groove (21) with an upward opening, and the movable contact piece (4) is provided with a clamping portion (43), wherein the clamping portion (43) is arranged in the first clamping groove (21) and is capable of swinging up and down, wherein second clamping grooves (44) are formed in two sides of the clamping portion (43), and the second clamping grooves (44 are clamped with the two sides of the first clamping groove (21) such that the movement of the movable contact piece (4) is limited, wherein the on-off portion (41) is arranged on one side of the clamping portion (43) close to the second static contact piece (3), and the movable contact piece (4) and the first static contact piece (2) are rotatably connected and electrically connected through the clamping connection between the clamping portion (43) and the first clamping groove (21).

5. The electromagnetic switch of claim 3, wherein a transition piece (45) is arranged on an upper side of one end of the movable contact piece (4) close to the first static contact piece (2), wherein the transition piece (45) extends towards one side of the second static contact piece (3), and the shifting portion (42) is arranged on one side of the transition piece (45) close to the second static contact piece (3).

6. The electromagnetic switch of claim 2, wherein the spring fixing portion (53) is located on a lower side of the rotating shaft connected to the movable member (5) and the base (1).

7. The electromagnetic switch of claim 2, wherein the movable portion (5) further comprises a second action portion (52), wherein the first action portion (51) and the second action portion (52) are respectively arranged on two sides of the rotating shaft connected to the movable member (5) and the base (1), wherein the base (1) is further provided with a bell (11), and one side of the second action portion (52) away from the first action portion (51) is provided with a striking head (54), wherein the striking head (54) is arranged at a position corresponding to the bell (11), and when the second action portion (52) rotates down, the striking head (54) is capable of striking the bell (11).

8. The electromagnetic switch of claim 1, wherein the electromagnetic switch further comprises an upper cover (12) arranged on an upper side of the base (1), and the first static contact piece (2), the second static contact piece (3), the movable contact piece (4), the movable member (5) and the electromagnetic driving assembly (7) are all arranged between the base (1) and the upper cover (12), wherein the upper cover (12) is provided with an opening (121), and the opening (121) is formed on an upper side of the movable member (5).

9. A time-adjustable controller, comprising:

the electromagnetic switch of claim 1, wherein the time-adjustable controller comprises:

a timer (8), wherein the timer (8) is provided with a control voltage output terminal (81), and the control voltage output terminal (81) is electrically connected to the coil (71), wherein the timer (8) is configured to control the control voltage output terminal (81) to output a voltage to the coil (71) when a preset duration is reached.

10. A toaster, comprising:

the time-adjustable controller of claim 9, wherein the toaster further comprises:

a housing (91) and a handle (92) capable of moving up and down, wherein the time-adjustable controller (96) is arranged in the housing (91), and the lower side of the handle (92) is capable of pressing the first action portion (51) of the movable member (5) down.

11. The toaster of claim 10, wherein the toaster further comprises:

a second spring (93) connected to the handle (92), and the movable member (5) further comprises:

a second action portion (52), wherein the first action portion (51) and the second action portion (52) are respectively arranged on two sides of the rotating shaft connected to the movable member (5) and the base (1), wherein an upper side of the second action portion (52) is provided with a first hook (55), and a lower side of the handle (92) is provided with a pressing portion (921) and a second hook (922), wherein the pressing portion (921) is arranged on an upper side of the first action portion (51), and the pressing portion (921) is configured to press the first action portion (51) down, wherein the second hook (922) is configured to be hooked with the first hook (55) when the first action portion (51) is pressed down, and the second spring (93) is capable of imposing an upward pulling force on the pressed handle (92).

12. The toaster of claim 10, wherein the timer (8) is provided with a time-adjustment potentiometer (83) and an indicator light (85), wherein the housing (91) is provided with a time-adjustment knob (94) connected to the time-adjustment potentiometer (83), wherein the time-adjustment knob (94) is provided with a light-transmitting hole (95) for allowing the light rays emitted by the indicator light (85) to pass through.

13. The toaster of claim 12, wherein the toaster further comprises:

a light-guide rotating shaft assembly (941), and the light-guide rotating shaft assembly (941) is arranged between the time-adjustment knob (94) and the indicator light (85), wherein one end of the light-guide rotating shaft assembly (941) close to the time-adjustment knob (94) is fixedly connected to the time-adjustment knob (94), and one end of the light-guide rotating shaft assembly (941) close to the indicator light (85) is directly opposite to the indicator light (85), wherein the light-guide rotating shaft assembly (941) is made of a light-guide material, thereby allowing the light emitted by the indicator light (85) to pass through the light-transmitting hole (95) via the light-guide rotating shaft assembly (941) and is emitted to the exterior of the time-adjustment knob (94), wherein the time-adjustment potentiometer (83) is arranged on one side of the indicator light (85) close to the time-adjustment knob (94), an adjustment hole (831) is formed in the time-adjustment potentiometer (83), and the indicator light (85) is directly opposite to the adjustment hole (831), wherein one side of the light-guide rotating shaft assembly (941) close to the indicator light (85) is inserted into the adjustment hole (831), and the light-transmitting hole (95) and the rotation center of the time-adjustment knob (94) are arranged in a staggered manner.

* * * * *